(12) United States Patent
Sakata

(10) Patent No.: US 11,402,007 B2
(45) Date of Patent: Aug. 2, 2022

(54) GEARING AND ROBOT

(71) Applicant: Seiko Epson Corporation, Toyko (JP)

(72) Inventor: Masaaki Sakata, Matsumoto (JP)

(73) Assignee: Seiko Epson Corporation

( * ) Notice: Subject to any disclaimer, the term of this patent is extended or adjusted under 35 U.S.C. 154(b) by 14 days.

(21) Appl. No.: 17/150,080

(22) Filed: Jan. 15, 2021

(65) Prior Publication Data

US 2021/0222765 A1 Jul. 22, 2021

(30) Foreign Application Priority Data

Jan. 17, 2020 (JP) .............................. JP2020-005984

(51) Int. Cl.
*F16H 49/00* (2006.01)
*B25J 9/10* (2006.01)

(52) U.S. Cl.
CPC .......... *F16H 49/001* (2013.01); *B25J 9/1025* (2013.01); *F16H 2049/003* (2013.01)

(58) Field of Classification Search
CPC .................. F16H 49/001; F16H 2049/003
USPC .......................................................... 74/640
See application file for complete search history.

(56) References Cited

U.S. PATENT DOCUMENTS 8,516,924 B2 * 8/2013 Pen ..................... F16H 57/0427
74/640
10,451,174 B2 * 10/2019 Sakata .................. F16H 57/041
10,837,543 B2 * 11/2020 Kusumoto .......... F16H 57/0476
11,085,509 B2 * 8/2021 Shirouzu ................... F16H 1/32
2002/0178861 A1 12/2002 Kobayashi

FOREIGN PATENT DOCUMENTS

JP 2002-349681 A 12/2002

* cited by examiner

*Primary Examiner* — Ha Dinh Ho
(74) *Attorney, Agent, or Firm* — Harness, Dickey & Pierce, P.L.C.

(57) ABSTRACT

A gearing includes an internal gear, a flexible external gear partially meshing with the internal gear and relatively rotating about a rotation axis to the internal gear, and a wave generator including a bearing contacting an inner circumferential surface of the external gear and a cam contacting an inner circumferential surface of the bearing and moving a mesh position between the internal gear and the external gear in a circumferential direction about the rotation axis, wherein an outer circumferential surface of the bearing forms a circular shape without contact with the cam, the inner circumferential surface of the external gear forms a circular shape without contact with the wave generator, and $$\frac{d1}{2} - \frac{d2}{2} \leq -0.003 \text{ [mm]}$$

and $$-6 \times 10^{-4} \leq \left(\frac{d1}{2} - \frac{d2}{2}\right) \Big/ \frac{d2}{2}$$

where an outer diameter of the bearing without contact with the cam is d1 [mm] and an inner diameter of the external gear without contact with the wave generator is d2 [mm].

5 Claims, 7 Drawing Sheets

GEARING AND ROBOT

The present application is based on, and claims priority from JP Application Serial Number 2020-005984, filed Jan. 17, 2020, the disclosure of which is hereby incorporated by reference herein in its entirety.

BACKGROUND

1. Technical Field

The present disclosure relates to a gearing and a robot.

2. Related Art

In a robot having a robot arm, for example, a joint part of the robot arm is driven by a motor. Generally, rotation of the motor is reduced by a gearing. As the gearing, e.g. a wave gearing as disclosed in JP-A-2002-349681 is known.

The wave gearing disclosed in JP-A-2002-349681 has an annular internal gear, an external gear placed inside of the internal gear, and a wave generator having an elliptical profile and fitted inside of the external gear. The external gear is bent in an elliptical shape by the wave generator and meshes with the internal gear in both end portions in the long axis directions of the elliptical shape. The internal gear and the external gear have a difference in the number of teeth. When the wave generator is rotated, the mesh position between the internal gear and the external gear moves in a circumferential direction and the internal gear and the external gear relatively rotate according to the difference in the number of teeth.

However, in the wave gearing, when engagement between the external gear and the wave generator is tight, that is, when a difference between the inner diameter of the external gear and the outer diameter of the wave generator is excessively small, supply of grease to between the external gear and the wave generator is insufficient and lubrication performance is lower, and thereby, a load is more likely to be applied. On the other hand, when the engagement between the external gear and the wave generator is loose, that is, when the difference between the inner diameter of the external gear and the outer diameter of the wave generator is excessively large, the contact area between the external gear and the wave generator is smaller, and stress is more likely to be concentrated on the bottom of the external teeth provided on the outer circumference of the external gear. As described above, when the engagement between the external gear and the wave generator is inappropriate, there is a problem that an excessive load is more likely to be applied and the reliability and the life of the wave gearing are reduced.

SUMMARY

A gearing according to an aspect of the present disclosure includes an internal gear, a flexible external gear partially meshing with the internal gear and relatively rotating about a rotation axis to the internal gear, and a wave generator including a bearing contacting an inner circumferential surface of the external gear and a cam contacting an inner circumferential surface of the bearing and moving a mesh position between the internal gear and the external gear in a circumferential direction about the rotation axis, wherein an outer circumferential surface of the bearing forms a circular shape without contact with the cam, the inner circumferential surface of the external gear forms a circular shape without contact with the wave generator, and $$\frac{d1}{2} - \frac{d2}{2} \leq -0.003 \text{ [mm]}$$

and $$-6 \times 10^{-4} \leq \left(\frac{d1}{2} - \frac{d2}{2}\right) \Big/ \frac{d2}{2}$$

where an outer diameter of the bearing without contact with the cam is d1 [mm] and an inner diameter of the external gear without contact with the wave generator is d2 [mm].

A robot according to an aspect of the present disclosure includes a first member, a second member pivoting relative to the first member, and the above described gearing transmitting a drive force for pivoting the second member relative to the first member from the first member to the second member or from the second member to the first member.

DESCRIPTION OF EXEMPLARY EMBODIMENTS

As below, a gearing and a robot according to the present disclosure will be explained in detail based on embodiments shown in the accompanying drawings.

1. Robot

Figure 1:
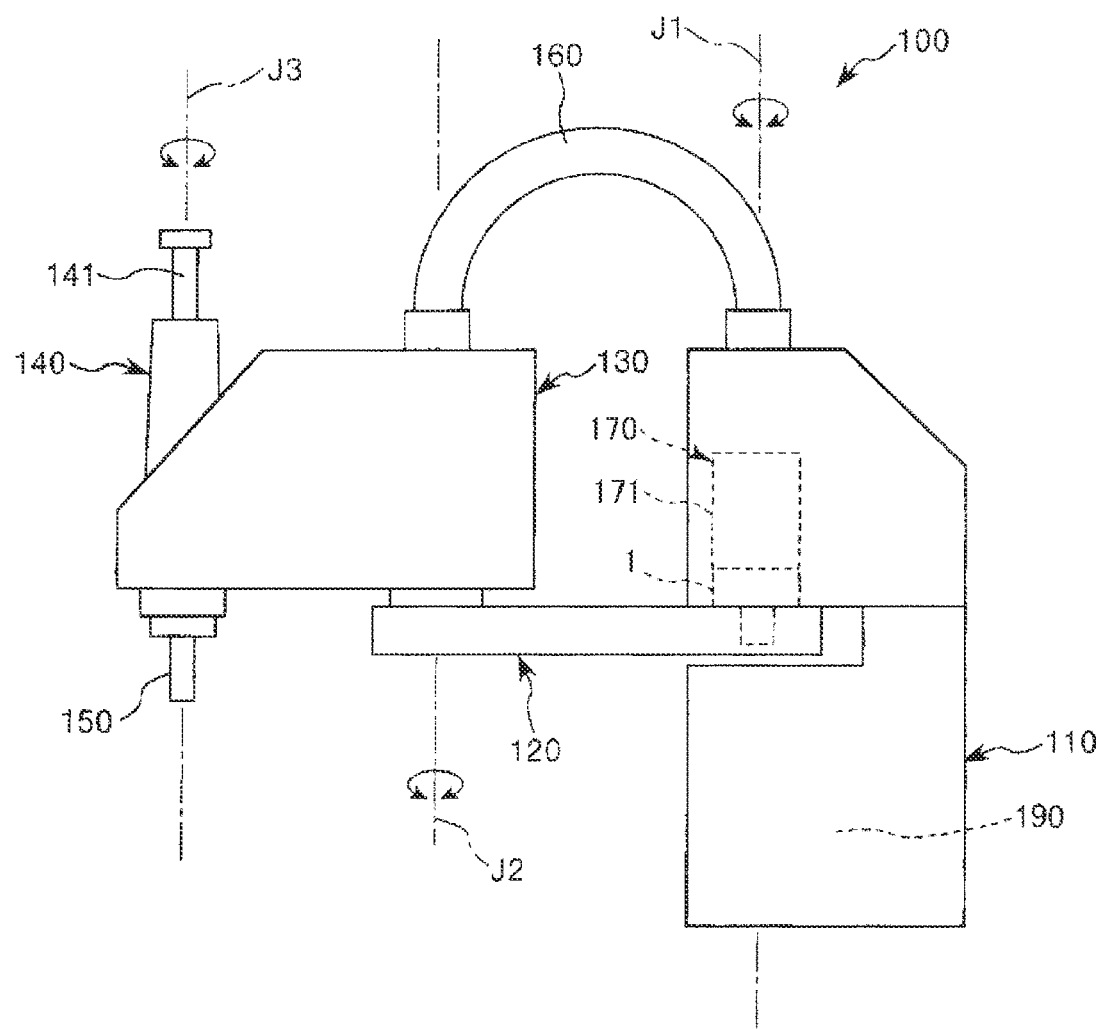
FIG. 1 is a side view showing a schematic configuration of a robot according to an embodiment of the present disclosure.

FIG. 1 is a side view showing a schematic configuration of a robot according to an embodiment of the present disclosure. Note that, hereinafter, for convenience of explanation, the upside in FIG. 1 is also referred to as "upper" and the downside is also referred to as "lower". Further, a base side on the right in FIG. 1 is also referred to as "proximal end side" and an opposite side thereto, i.e., an end effector side is also referred to as "distal end side". Furthermore, upward and downward directions in FIG. 1 are referred to as "vertical directions" and leftward and rightward directions are referred to as "horizontal directions".

The robot 100 shown in FIG. 1 is e.g. a robot used for work of feeding, removing, carrying, assembly, etc. of precision apparatuses and components forming the precision apparatuses. As shown in FIG. 1, the robot 100 has a base 110 as a first member, a first arm 120 as a second member that pivots relative to the base 110, a second arm 130 that pivots relative to the first arm 120, a working head 140, an end effector 150, and a wire routing part 160. As below, the respective parts of the robot 100 will be sequentially and briefly explained. Note that "pivot" includes movement in both directions of one direction and the opposite direction relative to a center point and rotation relative to the center point.

The base 110 is fixed to e.g. a floor surface (not shown) by bolts. Inside of the base 110, a control apparatus 190 that performs integrated control of the robot 100 is provided. Further, the first arm 120 is coupled to the base 110 pivotably about a first pivot axis J1 along the vertical directions relative to the base 110.

Within the base 110, a first drive unit 170 is placed. The first drive unit 170 has a motor 171 as a first motor such as a servo motor that generates a drive force for pivoting the first arm 120, and a gearing 1 as a first reducer that reduces rotation by the drive force of the motor 171. The input shaft of the gearing 1 is coupled to the rotation shaft of the motor 170 and the output shaft of the gearing 1 is coupled to the first arm 120. Accordingly, when the motor 171 drives and the drive force thereof is transmitted to the first arm 120 via the gearing 1, the first arm 120 pivots about the first pivot axis J1 within a horizontal plane.

The second arm 130 is coupled to the distal end portion of the first arm 120 pivotably about a second pivot axis J2 along the vertical directions relative to the first arm 120. Within the second arm 130, a second drive unit (not shown) is set. The second drive unit has the same configuration as the above described first drive unit 170, and has a second motor that generates a drive force for pivoting the second arm 130 and a second reducer that reduces the rotation by the drive force of the second motor. The drive force of the second motor is transmitted to the second arm 130 via the second reducer, and thereby, the second arm 130 pivots about the second pivot axis J2 relative to the first arm 120 within a horizontal plane.

The working head 140 is placed in the distal end portion of the second arm 130. The working head 140 has a spline shaft 141 inserted through a spline nut and a ball screw nut (not shown) coaxially placed in the distal end portion of the second arm 130. The spline shaft 141 is rotatable about an axis J3 thereof and movable in the upward and downward directions, i.e., elevatable relative to the second arm 130.

Within the second arm 130, a rotating motor and an elevating motor (not shown) are placed. The drive force of the rotating motor is transmitted to the spline nut by a drive force transmission mechanism (not shown) and, when the spline nut rotates forward and backward, the spline shaft 141 rotates forward and backward about the axis J3 along the vertical directions. On the other hand, the drive force of the elevating motor is transmitted to the ball screw nut by a drive force transmission mechanism (not shown) and, when the ball screw nut rotates forward and backward, the spline shaft 141 moves upward and downward.

The end effector 150 is coupled to the distal end portion, i.e., the lower end portion of the spline shaft 141. The end effector 150 is not particularly limited to, but includes e.g. one that grips an object to be transported and one that processes an object to be processed.

A plurality of wires coupled to the respective electronic components placed within the second arm 130 e.g. the second motor, the rotating motor, the elevating motor, etc. are routed into the base 110 through the tubular wire routing part 160 coupling the second arm 130 and the base 110. Further, the plurality of wires are collected within the base 110, and thereby, routed to the control apparatus 190 placed within the base 110 with wires coupled to the motor 170 etc.

The above described robot 100 includes the base 110 as the first member, the first arm 120 as the second member that pivots relative to the base 110, and the gearing 1 that transmits the drive force for pivoting the first arm 120 relative to the base 110 from the base 110 to the first arm 120 or from the first arm 120 to the base 110. In the embodiment, the drive force is transmitted from the base 110 side to the first arm 120 side. Thereby, the highly reliable robot 100 that may enjoy effects of the gearing 1, which will be described later, is obtained.

Note that, in the embodiment, the first member is the base 110 and the second member is the first arm 120, however, the members are limited to those, one of the base 110, the first arm 120, and the second arm 130 may be used as the first member and another one may be used as the second member. Specifically, for example, the first arm 120 may be used as the first member and the second arm 130 may be used as the second member.

2. Gearing

Figure 2:
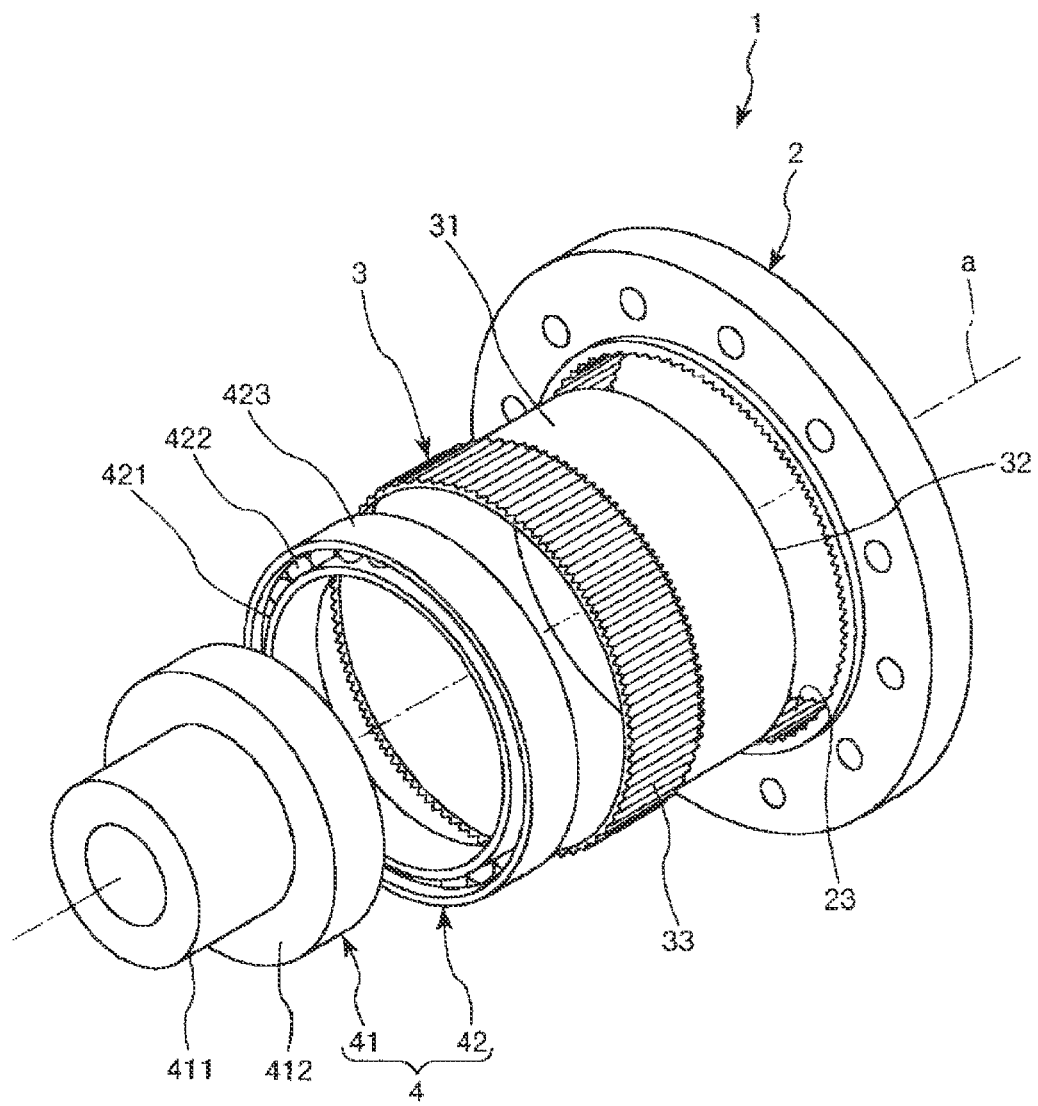
FIG. 2 is an exploded perspective view showing a gearing according to a preferred embodiment of the present disclosure.
Figure 3:
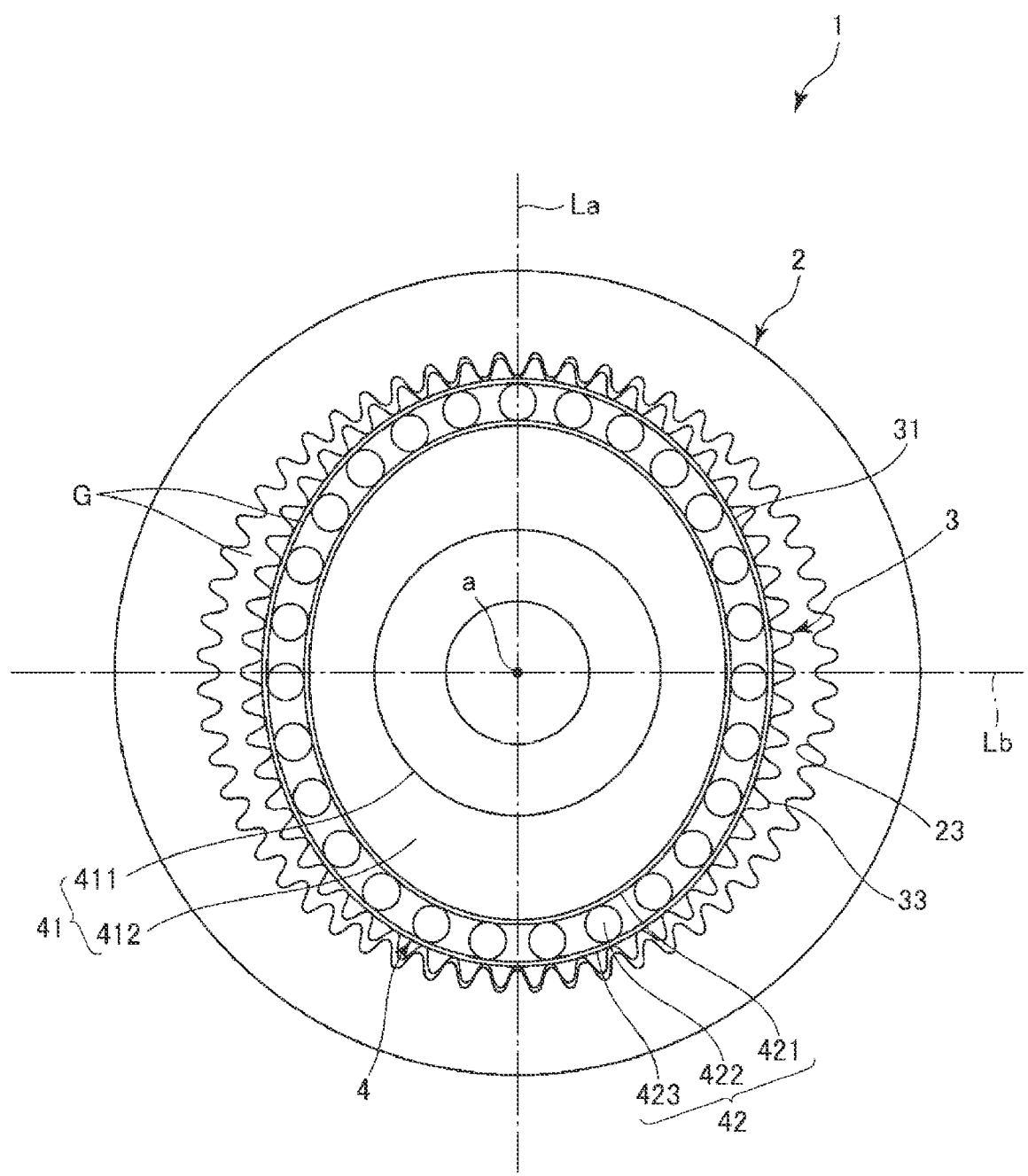
FIG. 3 is a front view of the gearing shown in FIG. 2.
Figure 4:
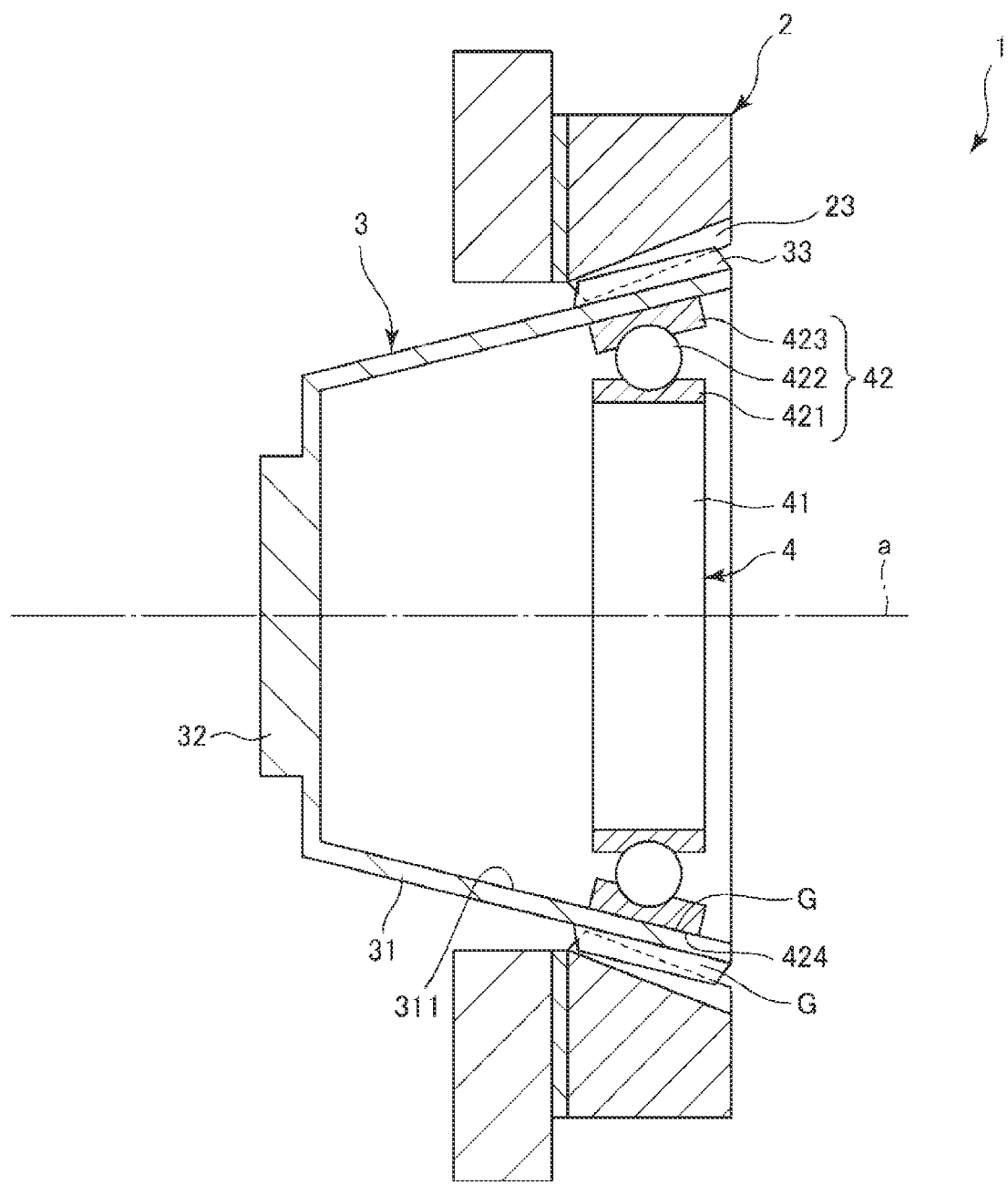
FIG. 4 is a longitudinal sectional view schematically showing the gearing shown in FIG. 2.
Figure 5:
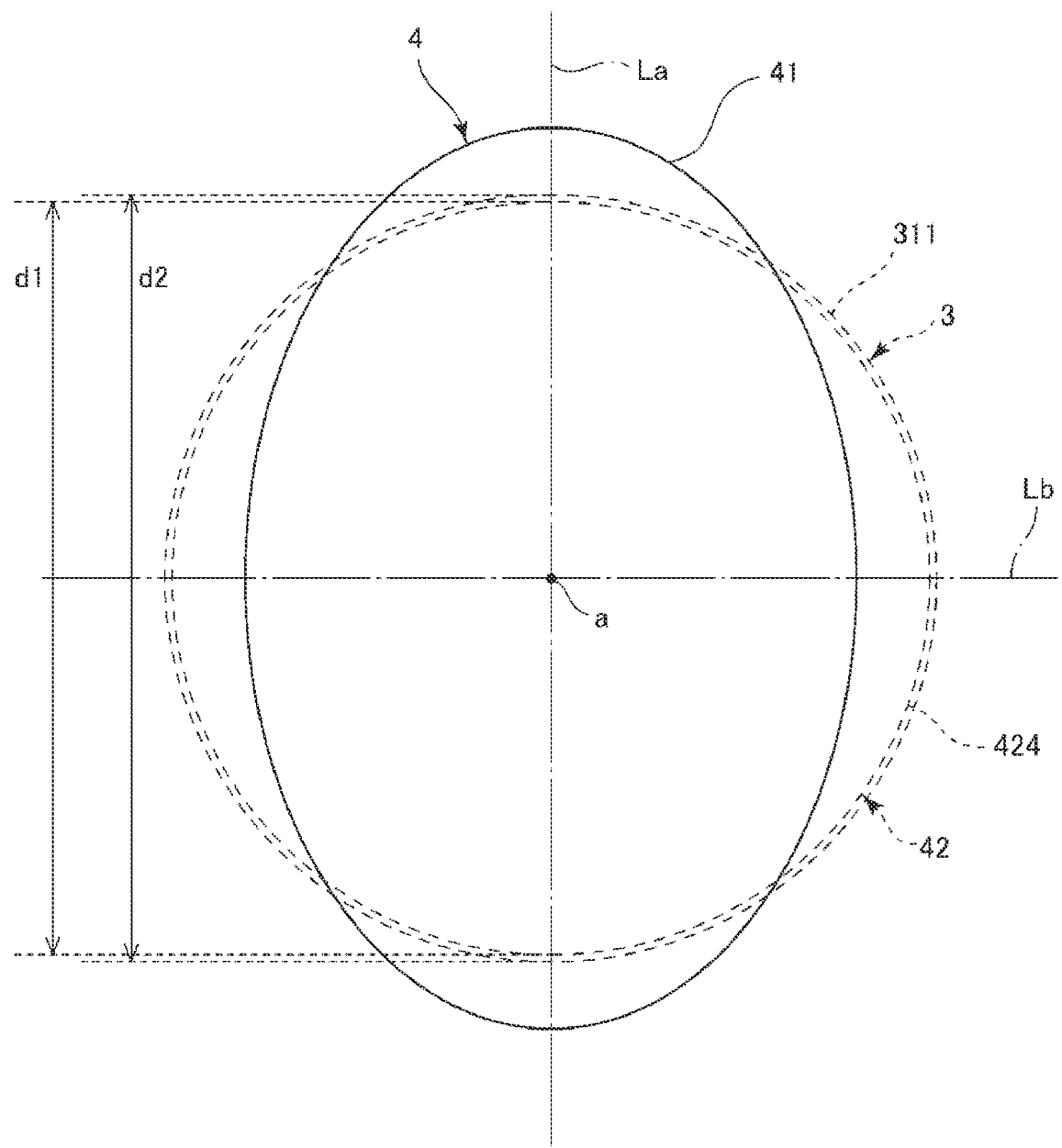
FIG. 5 schematically shows states of an outer circumferential surface of a wave generator and an inner circumferential surface of an external gear under natural conditions in the gearing shown in FIG. 2.
Figure 6:
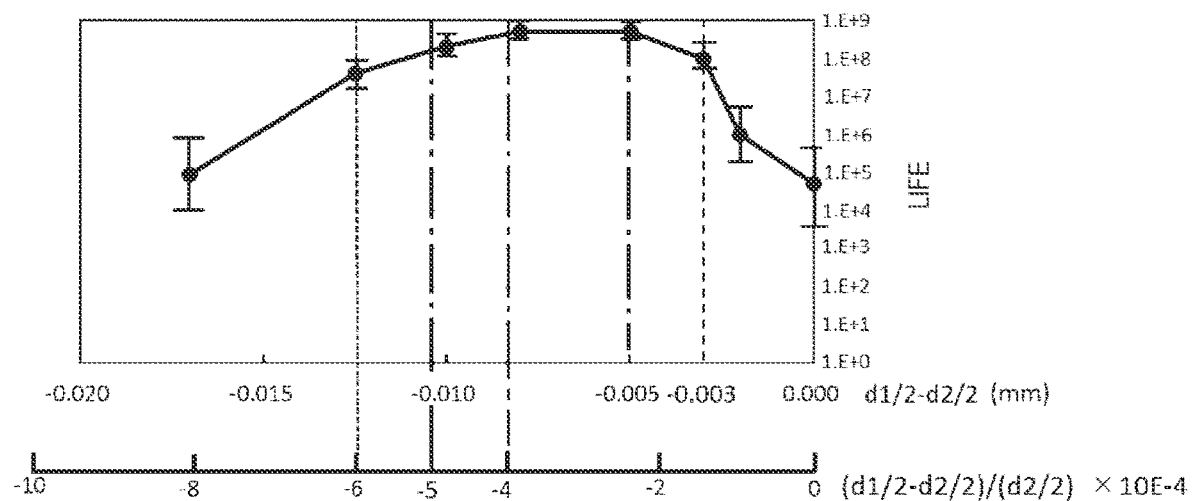
FIG. 6 is a graph showing a relationship between an engagement strength of the external gear with a bearing and a life of the gearing.
Figure 7:
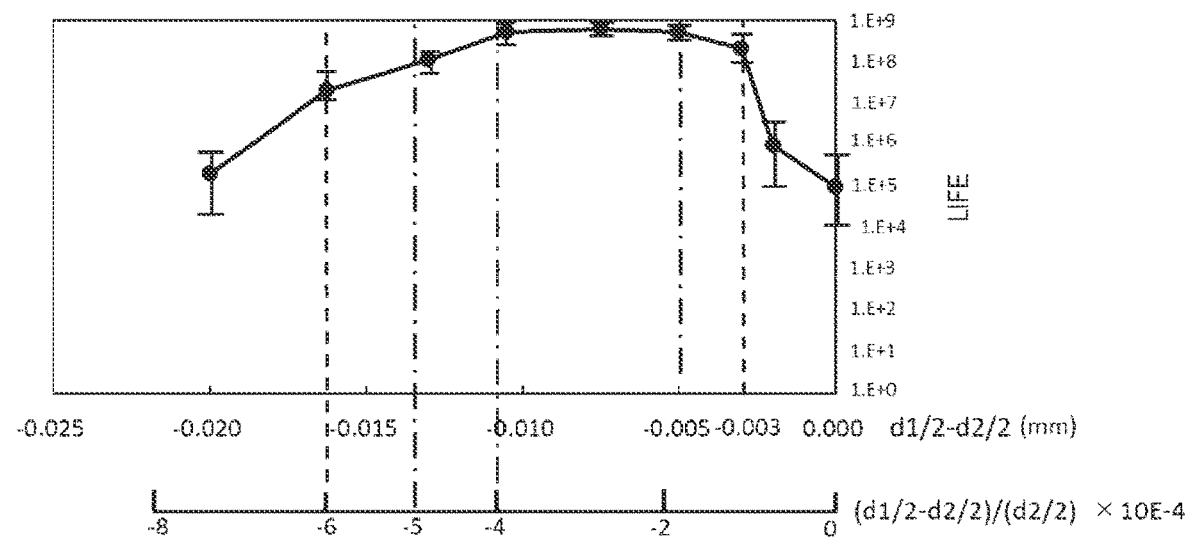
FIG. 7 is a graph showing a relationship between the engagement strength of the external gear with the bearing and the life of the gearing.
Figure 8:
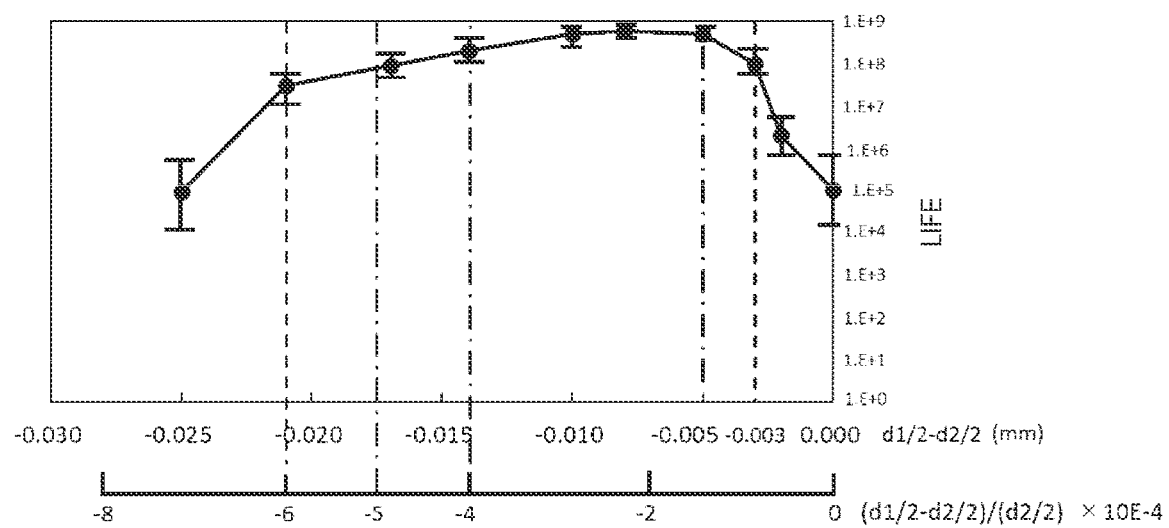
FIG. 8 is a graph showing a relationship between the engagement strength of the external gear with the bearing and the life of the gearing.

FIG. 2 is an exploded perspective view showing a gearing according to a preferred embodiment of the present disclosure. FIG. 3 is a front view of the gearing shown in FIG. 2. FIG. 4 is a longitudinal sectional view schematically showing the gearing shown in FIG. 2. FIG. 5 schematically shows states of an outer circumferential surface of a wave generator and an inner circumferential surface of an external gear under natural conditions in the gearing shown in FIG. 2. FIGS. 6 to 8 are graphs respectively showing relationships between an engagement strength of the external gear with a bearing and a life of the gearing. Note that, in the respective drawings, for convenience of explanation, dimensions of the respective parts are shown with appropriate exaggeration as necessary and dimensional rations between the respective parts are not necessarily the same as the real dimensional ratios.

The gearing 1 shown in FIG. 2 is a wave gearing and used as e.g. a reducer. The gearing 1 has an internal gear 2, a cup-shaped external gear 3 placed inside of the internal gear 2, and a wave generator 4 placed inside of the external gear 3. Further, a lubricant G such as grease is appropriately placed as necessary in the respective parts of the gearing 1, specifically, a meshing portion between the internal gear 2 and the external gear 3, an engagement portion between the external gear 3 and the wave generator 4, etc.

Here, one of the internal gear 2, the external gear 3, and the wave generator 4 is coupled to the base 110 of the above described robot 100, and another one is coupled to the first arm 120 of the above described robot 100. In the embodiment, the internal gear 2 is fixed to the base 110, the external gear 3 is coupled to the first arm 120, and the wave generator 4 is coupled to the rotation shaft of the motor 171.

Accordingly, when the rotation shaft of the motor 170 rotates, the wave generator 4 rotates at the same rotation speed as that of the rotation shaft of the motor 171. The internal gear 2 and the external gear 3 are different in the number of teeth from each other, and thereby, the gears relatively rotate about an axial line a as a rotation axis due to the difference in the number of teeth while the mesh position with each other moves in a circumferential direction. In the embodiment, the number of teeth of the internal gear 2 is larger than the number of teeth of the external gear 3, and thus, the external gear 3 may be rotated at a lower rotation speed than the rotation speed of the rotation shaft of the motor 171. That is, the reducer with the wave generator 4 at the input shaft side and the external gear 3 at the output shaft side may be realized.

Note that the coupling configuration of the internal gear 2, the external gear 3, and the wave generator 4 is not limited to the above described configuration. For example, even when the external gear 3 is fixed to the base 110 and the internal gear 2 is coupled to the first arm 120, the gearing 1 may be used as a reducer. Or, even when the external gear 3 is coupled to the rotation shaft of the motor 171, the gearing 1 may be used as a reducer. In this case, the wave generator 4 may be fixed to the base 110 and the internal gear 2 may be coupled to the first arm 120. Or, when the gearing 1 is used as an increaser, that is, when the external gear 3 is rotated at a higher rotation speed than the rotation speed of the rotation shaft of the motor 171, the above described relationship between the input side and the output side may be inverted.

As shown in FIG. 2, the internal gear 2 is a ring-shaped rigid gear having internal teeth 23 and formed by a rigid body that does not substantially bend in the radial direction. Note that the fixing method for the internal gear 2 and the base 110 is not particularly limited to, but includes e.g. screws or the like.

The external gear 3 is inserted into the internal gear 2. The external gear 3 is a flexible gear having external teeth 33 meshing with the internal teeth 23 of the internal gear 2 and being flexurally deformable in the radial direction. The number of teeth of the external gear 3 is smaller than the number of teeth of the internal gear 2. The numbers of teeth of the external gear 3 and the internal gear 2 are different from each other, and thereby, as described above, the reducer may be realized by the gearing 1.

In the embodiment, the external gear 3 has the cup shape, i.e., an annular shape with the left part in FIG. 4 closed by a bottom part 32, and the external teeth 33 are formed on the outer circumferential surface thereof. The external gear 3 has a cylindrical barrel part 31 with opening one end portion and the bottom part 32 as an attachment part projecting from the other end portion of the barrel part 31. The barrel part 31 has the external teeth 33 meshing with the internal gear 2 around the axial line a. The shaft body at the output side e.g. the rotation shaft of the motor 171 is attached to the bottom part 32 by screws or the like.

As shown in FIGS. 3 and 4, the wave generator 4 is placed inside of the external gear 3 and rotatable about the axial line a. Further, the wave generator 4 deforms the lateral section of the barrel part 31 of the external gear 3, which has a circular shape under natural conditions, into an elliptical shape or elongated circular shape with a long axis La and a short axis Lb and partially meshes a part of the external teeth 33 with a part of the internal teeth 23 of the internal gear 2. Here, the external gear 3 and the internal gear 2 are meshed with each other inside and outside rotatably about the same axis line a.

The wave generator 4 has a cam 41 and a bearing 42 attached to the outer circumference of the cam 41. The cam 41 has a shaft portion 411 rotating about the axial line a and a cam portion 412 projecting from one end of the shaft portion 411 toward the outside. The cam portion 412 forms an elliptical shape or elongated circular shape with the long axis La along the upward and downward directions in FIG. 3 as seen from a direction along the axial line a. The bearing 42 is a ball bearing and has flexible inner ring 421 and outer ring 423 and a plurality of balls 422 placed between the rings. Note that the bearing 42 forms a circular shape as seen from the direction along the axial line a when the bearing is under natural conditions, that is, when the bearing is not fitted in the cam 41, in other words, before assembly.

As shown in FIG. 4, the inner ring 421 is fitted to the outer circumferential surface of the cam portion 412 of the cam 41 and elastically deforms in an elliptical shape or elongated circular shape along the outer circumferential surface of the cam portion 412. With the deformation, the outer ring 423 also elastically deforms in an elliptical shape or elongated circular shape. An outer circumferential surface 424 of the outer ring 423 is in contact with an inner circumferential surface 311 of the barrel part 31. Further, the outer circumferential surface of the inner ring 421 and the inner circumferential surface of the outer ring 423 respectively serve as track surfaces that guide and roll the plurality of balls 422 along the circumferential direction. Furthermore, the plurality of balls 422 are held by a holder (not shown) to keep fixed intervals in the circumferential direction.

In the above described wave generator 4, the orientation of the cam portion 412 changes with the rotation of the cam 41 about the axial line a, and the outer ring 423 also deforms with the change and the mesh position between the internal gear 2 and the external gear 3 is moved in the circumferential direction. Note that the inner ring 421 is fixedly placed relative to the outer circumferential surface of the cam portion 412, and the deformation condition is not changed. The mesh position between the internal gear 2 and the external gear 3 is moved in the circumferential direction, and thereby, the gears relatively rotate about the axial line a due to the difference in the number of teeth between the internal gear 2 and the external gear 3. That is, the first arm 120 to which the external gear 3 is fixed rotates about the axial line a relative to the base 110 to which the internal gear 2 is fixed.

As above, the overall configuration of the gearing 1 is explained. Next, an engagement strength between the wave generator 4 and the external gear 3 will be explained in detail.

As explained in the above described "Related Art", when the engagement between the external gear 3 and the wave generator 4 is too tight, that is, when a difference between an inner diameter d2 of the external gear 3 and an outer diameter d1 of the wave generator 4 is excessively small, supply of the lubricant G to between the external gear 3 and the wave generator 4 is insufficient, lubrication performance is lower, and, a load is more likely to be applied to the gearing 1. On the other hand, when the engagement between the external gear 3 and the wave generator 4 is too loose, that is, when the difference between the inner diameter d2 of the external gear 3 and the outer diameter d1 of the wave generator 4 is excessively large, the contact area between the external gear 3 and the wave generator 4 is smaller, and stress is more likely to be concentrated on the bottom of the external teeth 33 provided on the outer circumference of the external gear 3. As described above, when the engagement between the external gear 3 and the wave generator 4 is inappropriate, an excessive load is more likely to be applied to the gearing 1 and the reliability and the life of the gearing 1 may be reduced.

Accordingly, in the gearing 1 of the embodiment, the values of the inner diameter d2 and the outer diameter d1 are set to appropriate values, the load applied to the gearing 1 is reduced, and the reduction of the reliability and the life of the gearing 1 is suppressed. As below, appropriate magnitude of the difference between the inner diameter d2 and the outer diameter d1 will be explained.

Note that, as shown in FIG. 5, the inner circumferential surface 311 of the external gear 3 forms a circular shape as seen from the axial line a direction when the wave generator 4 is not fitted inside thereof. Similarly, the outer circumferential surface 424 of the bearing 42 forms a circular shape as seen from the direction along the axial line a when the cam 41 is not fitted inside thereof. That is, the inner circumferential surface 311 of the external gear 3 and the outer circumferential surface 424 of the bearing 42 respectively form circular shapes as seen from the axial line a direction in the conditions before assembly and after disassembly of the gearing 1 (hereinafter, the conditions are also referred to as "natural conditions"). Note that "circular shape" includes not only a shape that coincides with a circle but also e.g. a shape slightly different from a circle due to an error that may be caused in manufacturing or the like.

The above described inner diameter d2 of the external gear 3 refers to the inner diameter of the external gear 3 under natural conditions and the above described outer diameter d1 of the bearing 42 refers to the outer diameter of the bearing 42 under natural conditions. Note that the method of obtaining the inner diameter d2 and the outer diameter d1 is not particularly limited, but the inner diameter d2 and the outer diameter d1 may be directly measured using various measuring devices. Or, for example, the lengths of the circumferences may be measured using various measuring devices and the diameters may be calculated using a formula [diameter=length of circle/circular constant] from the measurement results. Particularly, according to the latter case, even when the inner circumference of the external gear 3 and the outer circumference of the bearing 42 are slightly different from circular shapes, the diameters assuming that the shapes of the circumferences are circular shapes may be obtained. Here, it is preferable that the outer diameter d1 and the inner diameter d2 are measured in the same manner.

In the embodiment, the outer diameter d1 and the inner diameter d2 satisfy both the following expression (1) and expression (2). Here, the units of the outer diameter d1 and the inner diameter d2 are [mm].

$$\frac{d1}{2} - \frac{d2}{2} \leq -0.003 \text{ [mm]} \quad (1)$$

$$-6 \times 10^{-4} \leq \left(\frac{d1}{2} - \frac{d2}{2}\right) / \frac{d2}{2} \quad (2)$$

The above described expression (1) defines the minimum value of the difference between the outer diameter d1 and the inner diameter d2. When the expression (1) is satisfied, too much tightening of the engagement between the external gear 3 and the bearing 42 may be suppressed. Accordingly, the grease is sufficiently supplied to between the external gear 3 and the bearing 42, specifically, between the inner circumferential surface 311 of the external gear 3 and the outer circumferential surface 424 of the outer ring 423 of the bearing 42, and reduction of the lubrication performance between the external gear 3 and the outer ring 423 is effectively suppressed. As a result, a load is harder to be applied to the gearing 1 and reduction of the mechanical characteristics, the reliability, and the life of the gearing 1 may be effectively suppressed.

On the other hand, the above described expression (2) defines the maximum value of the difference between the outer diameter d1 and the inner diameter d2. When the expression (2) is satisfied, too much loosening of the engagement between the external gear 3 and the bearing 42 may be suppressed. Accordingly, the area of the contact portion between the external gear 3 and the bearing 42, more specifically, the contact portion between the inner circumferential surface 311 of the external gear 3 and the outer circumferential surface 424 of the outer ring 423 of the bearing 42 is secured to be sufficiently wider, and the stress concentration on the external gear 3, particularly, the bottom part of the external teeth 33 may be effectively suppressed. As a result, a local load is harder to be applied to the gearing 1 and the reduction of the mechanical characteristics, the reliability, and the life of the gearing 1 may be effectively suppressed.

As described above, the difference between the outer diameter d1 and the inner diameter d2 is set to be larger than the minimum value of the expression (1) and smaller than the maximum value of the expression (2), and thereby, the reduction of the mechanical characteristics, the reliability, and the life of the gearing 1 may be effectively suppressed.

Note that the outer diameter d1 and the inner diameter d2 satisfy the relationship of the expression (1), and it is preferable that the diameters satisfy the following expression (3). Thereby, the above described effects are more remarkable. That is, the grease is supplied more sufficiently to between the inner circumferential surface 311 of the external gear 3 and the outer circumferential surface 424 of the outer ring 423 of the bearing 42, and reduction of the lubrication performance between the external gear 3 and the outer ring 423 is effectively suppressed. As a result, a load is even harder to be applied to the gearing 1 and the reduction of the mechanical characteristics, the reliability, and the life of the gearing 1 may be suppressed more effectively.

$$\frac{d1}{2} - \frac{d2}{2} \leq -0.005 \text{ mm} \quad (3)$$

Further, the outer diameter d1 and the inner diameter d2 satisfy the relationship of the expression (2), and it is preferable that the diameters satisfy the following expression (4) and more preferable that the diameters satisfy the following expression (5). Thereby, the above described effects are more remarkable. That is, the area of the contact portion between the external gear 3 and the bearing 42 may be secured to be wider more sufficiently, and the stress concentration on the external gear 3, particularly, the bottom part of the external teeth 33 may be suppressed more effectively. As a result, a local load is even harder to be applied to the gearing 1 and the reduction of the mechanical characteristics, the reliability, and the life of the gearing 1 may be suppressed more effectively.

$$-4 \times 10^{-4} \leq \left(\frac{d1}{2} - \frac{d2}{2}\right) / \frac{d2}{2} \quad (4)$$

$$-3 \times 10^{-4} \leq \left(\frac{d1}{2} - \frac{d2}{2}\right) / \frac{d2}{2} \quad (5)$$

Next, the grounds for the above described expression (1) to (5) will be described based on the following several specific examples.

As a first example, the gearing 1 in which the outer diameter of the internal gear 2 is ϕ60 mm, the inner diameter of the internal gear 2 and the outer diameter of the external gear 3 are ϕ44 mm, and the reduction ratio is 50 was assembled and operated. The gearing was continuously operated under an operation condition that the number of input shaft rotations is 3000 rpm, the average load torque is 25 Nm, and the peak torque is 70 Nm. The total number of input shaft rotations until the gearing 1 is broken was measured as the life. FIG. 6 shows results of a plurality of the measurements with different relationships between the outer diameter d1 and the inner diameter d2. Note that the inner diameter d2 of the external gear 3 and the outer diameter d1 of the bearing 42 were respectively measured by measurements of inner diameters in the four directions at intervals of 45° in the circumferential direction using an air micrometer before the assembly and calculation of an average value of the inner diameters.

As shown in FIG. 6 and the following Table 1 and Table 2, the life of the gearing 1 may be secured to be sufficiently long by satisfaction of the above described expression (1) and expression (2). Particularly, it is known that, when the value exceeds the value defined by the expression (1), the life of the gearing 1 steeply decreases and, when the value exceeds the value defined by the expression (2), the life of the gearing 1 steeply decreases. Therefore, it is known that the life of the gearing 1 is longer by satisfaction of the above described expression (1) and expression (2). Further, it is known that the life of the gearing 1 is even longer by satisfaction of the above described expression (3). Furthermore, it is known that the life of the gearing 1 is even longer by satisfaction of the above described expression (4) and the life of the gearing 1 is even longer by satisfaction of the above described expression (5).

TABLE 1

| (d1/2−d2/2) [mm] | Evaluation | Reason |
| --- | --- | --- |
| 0 | Poor | The lubricant G is harder to enter between the outer circumferential surface of the outer ring 423 and the inner surface of the external gear 3. |
| −0.001 | Poor | The lubricant G is harder to enter between the outer circumferential surface of the outer ring 423 and the inner surface of the external gear 3. |
| −0.002 | Poor | The lubricant G is harder to enter between the outer circumferential surface of the outer ring 423 and the inner surface of the external gear 3. |
| −0.003 | — | The grease enters between the outer ring 423 and the inner surface of the external gear 3. |
| −0.004 | — | The grease enters between the outer ring 423 and the inner surface of the external gear 3. |
| −0.005 | Good | The grease sufficiently enters between the outer ring 423 and the inner surface of the external gear 3. |
| −0.006 | Good | The grease sufficiently enters between the outer ring 423 and the inner surface of the external gear 3. |
| −0.007 | Good | The grease sufficiently enters between the outer ring 423 and the inner surface of the external gear 3. |
| −0.008 | Good | The grease sufficiently enters between the outer ring 423 and the inner surface of the external gear 3. |

TABLE 2

| (d1/2−d2/2)/(d2/2) | Evaluation | Reason |
| --- | --- | --- |
| −3.0 × 10e−4 | Good | The engagement between the outer ring 423 and the external gear 3 is appropriate and the stress concentration on the bottom of the external teeth 33 of the external gear 3 is sufficiently small. The effect is exerted more greatly than that at −4.0 × 10E−4 depending on the outer diameter of the internal gear 2. |
| −4.0 × 10e−4 | Good | The engagement between the outer ring 423 and the external gear 3 is appropriate and the stress concentration on the bottom of the external teeth 33 of the external gear 3 is sufficiently small. The effect is exerted more greatly than that at −4.0 × 10E−4 depending on the outer diameter of the internal gear 2. |
| −5.0 × 10e−4 | — | The engagement between the outer ring 423 and the external gear 3 is moderately loose, but the stress concentration on the bottom of the external teeth 33 of the external gear 3 is small. |
| −6.0 × 10e−4 | — | The engagement between the outer ring 423 and the external gear 3 is moderately loose, but the stress concentration on the bottom of the external teeth 33 of the external gear 3 is small. |
| −7.0 × 10e−4 | Poor | The engagement between the outer ring 423 and the external gear 3 is loose, and the stress is concentrated on the bottom of the external teeth 33 of the external gear 3. |
| −8.0 × 10e−5 | Poor | The engagement between the outer ring 423 and the external gear 3 is loose, and the stress is concentrated on the bottom of the external teeth 33 of the external gear 3. |
| −8.0 × 10e−6 | Poor | The engagement between the outer ring 423 and the external gear 3 is loose, and the stress is concentrated on the bottom of the external teeth 33 of the external gear 3. |

Note that, when the inner diameter of the internal gear 2 and the outer diameter of the external gear 3 are equal to or larger than φ35 mm and smaller than φ50 mm, substantially the same measurement results as those of the above described first example were obtained. Further, it is known that, when the diameters are smaller than those, the life of the gearing 1 is longer by satisfaction of the expression (1) and the expression (2), and the life of the gearing 1 is even longer by satisfaction of one of the expression (3), the expression (4), and the expression (5).

As a second example, the gearing 1 in which the outer diameter of the internal gear 2 is φ75 mm, the inner diameter of the internal gear 2 and the outer diameter of the external gear 3 are φ57 mm, and the reduction ratio is was assembled and operated. The gearing 1 was continuously operated under an operation condition that the number of input shaft rotations is 3000 rpm, the average load torque is 60 Nm, and the peak torque is 160 Nm. The total number of input shaft rotations until the gearing 1 is broken was measured as the life. FIG. 7 shows results of a plurality of the measurements with different relationships between the outer diameter d1 and the inner diameter d2. Note that the inner diameter d2 of the external gear 3 and the outer diameter d1 of the bearing 42 were respectively measured by the same method as that of the above described first example.

As shown in FIG. 7, the life of the gearing 1 may be secured to be sufficiently long by satisfaction of the above described expression (1) and expression (2). Particularly, it is known that, when the value exceeds the value defined by the expression (1), the life of the gearing 1 steeply decreases and, when the value exceeds the value defined by the expression (2), the life of the gearing 1 steeply decreases. Therefore, it is known that the life of the gearing 1 is longer by satisfaction of the above described expression (1) and expression (2). Further, it is known that the life of the gearing 1 is even longer by satisfaction of the above described expression (3). Furthermore, it is known that the life of the gearing 1 is even longer by satisfaction of the above described expression (4) and the life of the gearing 1 is even longer by satisfaction of the above described expression (5).

Note that, when the inner diameter of the internal gear 2 and the outer diameter of the external gear 3 are equal to or larger than $\phi$50 mm and smaller than $\phi$65 mm, substantially the same measurement results as those of the above described second example were obtained.

As a third example, the gearing 1 in which the outer diameter of the internal gear 2 is $\phi$100 mm, the inner diameter of the internal gear 2 and the outer diameter of the external gear 3 are $\phi$73 mm, and the reduction ratio is was assembled and operated. The gearing 1 was continuously operated under an operation condition that the number of input shaft rotations is 3000 rpm, the average load torque is 130 Nm, and the peak torque is 350 Nm. The total number of input shaft rotations until the gearing 1 is broken was measured as the life. FIG. 8 shows results of a plurality of the measurements with different relationships between the outer diameter d1 and the inner diameter d2. Note that the inner diameter d2 of the external gear 3 and the outer diameter d1 of the bearing 42 were respectively measured by the same method as that of the above described first example.

As shown in FIG. 8, the life of the gearing 1 may be secured to be sufficiently long by satisfaction of the above described expression (1) and expression (2). Particularly, it is known that, when the value exceeds the value defined by the expression (1), the life of the gearing 1 steeply decreases and, when the value exceeds the value defined by the expression (2), the life of the gearing 1 steeply decreases. Therefore, it is known that the life of the gearing 1 is longer by satisfaction of the above described expression (1) and expression (2). Further, it is known that the life of the gearing 1 is even longer by satisfaction of the above described expression (3). Furthermore, it is known that the life of the gearing 1 is even longer by satisfaction of the above described expression (4) and the life of the gearing 1 is even longer by satisfaction of the above described expression (5).

Note that, when the inner diameter of the internal gear 2 and the outer diameter of the external gear 3 are equal to or larger than $\phi$65 mm and smaller than $\phi$80 mm, substantially the same measurement results as those of the above described second example were obtained. Further, it is known that, when the diameters are larger than those, the life of the gearing 1 is longer by satisfaction of the expression (1) and the expression (2), and the life of the gearing 1 is even longer by satisfaction of one of the expression (3), the expression (4), and the expression (5).

As described above, regardless of the size of the gearing 1, the life of the gearing 1 may be effectively improved by satisfaction of the above described expression (1) and expression (2).

As above, the gearing 1 is explained. As described above, the gearing 1 has the internal gear 2, the flexible external gear 3 partially meshing with the internal gear 2 and relatively rotating about the axial line a as the rotation axis to the internal gear 2, and the wave generator 4 including the bearing 42 contacting the inner circumferential surface 311 of the external gear 3 and the cam 41 contacting the inner circumferential surface of the bearing 42 and moving the mesh position between the internal gear 2 and the external gear 3 in the circumferential direction about the axial line a as the rotation axis. Further, the outer circumferential surface 424 of the bearing 42 forms the circular shape without contact with the cam 41 and the inner circumferential surface 311 of the external gear 3 forms the circular shape without contact with the wave generator 4, and the relationships of the above described expression (1) and expression (2) are satisfied when the outer diameter of the bearing 42 without contact with the cam 41 is d1 [mm] and the inner diameter of the external gear 3 without contact with the wave generator 4 is d2 [mm].

The expression (1) is satisfied, and thereby, too much tightening of the engagement between the external gear 3 and the bearing 42 may be suppressed. Accordingly, the grease is sufficiently supplied to between the external gear and the bearing 42, and reduction of the lubrication performance between the external gear 3 and the outer ring 423 is effectively suppressed. As a result, a load is harder to be applied to the gearing 1 and the reduction of the mechanical characteristics, the reliability, and the life of the gearing 1 may be effectively suppressed. On the other hand, the expression (2) is satisfied, and thereby, too much loosening of the engagement between the external gear 3 and the bearing 42 may be suppressed. Accordingly, the area of the contact portion between the external gear 3 and the bearing 42 is secured to be sufficiently wider, and the stress concentration on the external gear 3 may be effectively suppressed. As a result, a local load is harder to be applied to the gearing 1 and the reduction of the mechanical characteristics, the reliability, and the life of the gearing 1 may be effectively suppressed. As described above, the expression (1) and the expression (2) are satisfied, and thereby, the reduction of the mechanical characteristics, the reliability, and the life of the gearing 1 may be effectively suppressed.

Further, as described above, it is preferable that the gearing 1 satisfies the expression (3). Thereby, the above described effects are more remarkable, and the reduction of the mechanical characteristics, the reliability, and the life of the gearing 1 may be suppressed more effectively.

Furthermore, in the gearing 1, it is preferable that the expression (4) is satisfied and more preferable that the expression (5) is satisfied. Thereby, the above described effects are more remarkable, and the reduction of the mechanical characteristics, the reliability, and the life of the gearing 1 may be suppressed more effectively.

As above, the gearing and the robot according to the present disclosure are explained based on the illustrated embodiments, however, the present disclosure is not limited to those. The configurations of the respective parts may be replaced by arbitrary configurations having the same functions. Further, another arbitrary configuration may be added to the present disclosure.

In the above described embodiments, the horizontal articulated robot is explained, however, the robot according to the present disclosure is not limited to that. For example, the number of joints of the robot is arbitrary, and the robot can be applied to a vertical articulated robot.

Further, in the above described embodiments, the case where the external gear of the gearing has the cup shape (tubular shape with bottom) is explained as an example, however, the external gear is not limited to that, for example, the external gear may have a hat shape (tubular shape with flange). When the external gear has a hat shape, the external gear has a flange portion extending from the other end portion of the barrel part outward in the radial direction as an attachment portion.

What is claimed is:

1. A gearing comprising:

an internal gear;

a flexible external gear partially meshing with the internal gear and relatively rotating about a rotation axis to the internal gear; and a wave generator including a bearing contacting an inner circumferential surface of the external gear and a cam contacting an inner circumferential surface of the bearing and moving a mesh position between the internal gear and the external gear in a circumferential direction about the rotation axis, wherein an outer circumferential surface of the bearing forms a circular shape without contact with the cam, the inner circumferential surface of the external gear forms a circular shape without contact with the wave generator, and $$\frac{d1}{2} - \frac{d2}{2} \leq -0.003 \ [\text{mm}]$$

and $$-6 \times 10^{-4} \leq \left(\frac{d1}{2} - \frac{d2}{2}\right) \bigg/ \frac{d2}{2}$$

where an outer diameter of the bearing without contact with the cam is d1 [mm] and an inner diameter of the external gear without contact with the wave generator is d2 [mm].

2. The gearing according to claim 1, wherein $$\frac{d1}{2} - \frac{d2}{2} \leq -0.005 \ [\text{mm}].$$

3. The gearing according to claim 1, wherein $$-4 \times 10^{-4} \leq \left(\frac{d1}{2} - \frac{d2}{2}\right) \bigg/ \frac{d2}{2}.$$

4. The gearing according to claim 1, wherein $$-3 \times 10^{-4} \leq \left(\frac{d1}{2} - \frac{d2}{2}\right) \bigg/ \frac{d2}{2}.$$

5. A robot comprising:

a first member;

a second member pivoting relative to the first member; and the gearing according to claim 1, transmitting a drive force for pivoting the second member relative to the first member from the first member to the second member or from the second member to the first member.

* * * * *